US006043769A

United States Patent [19]

Rowe et al.

[11] Patent Number: 6,043,769

[45] Date of Patent: Mar. 28, 2000

[54] RADAR ABSORBER AND METHOD OF MANUFACTURE

[75] Inventors: Paul E. Rowe, Mashpee; Michael T. Kocsik, Sherborn, both of Mass.

[73] Assignee: Cuming Microware Corporation, Avon, Mass.

[21] Appl. No.: 09/121,293

[22] Filed: Jul. 23, 1998

Related U.S. Application Data

[60] Provisional application No. 60/053,502, Jul. 23, 1997.

[51] Int. Cl.[7] .............................. H01Q 17/00; B32B 5/12

[52] U.S. Cl. .................................... 342/4; 342/1; 428/113

[58] Field of Search ............................. 342/1, 4; 428/113

[56] References Cited

U.S. PATENT DOCUMENTS

| | | | |
|---|---|---|---|
| 3,609,104 | 9/1971 | Ehrreich | 252/511 |
| 4,381,510 | 4/1983 | Wren | 343/909 |
| 4,438,221 | 3/1984 | Fracalossi et al. | 521/55 |
| 4,538,151 | 8/1985 | Hatakeyama et al. | 342/1 |
| 4,568,603 | 2/1986 | Oldham | 428/195 |
| 4,581,284 | 4/1986 | Eggert et al. | 428/283 |
| 4,595,623 | 6/1986 | Du Pont et al. | 428/195 |
| 4,683,246 | 7/1987 | Davis et al. | 521/54 |
| 4,843,104 | 6/1989 | Melber et al. | 521/54 |
| 4,980,102 | 12/1990 | Hill | 264/53 |
| 5,185,381 | 2/1993 | Ruffoni | 521/52 |
| 5,310,598 | 5/1994 | Yoshinaka et al. | 428/328 |
| 5,325,094 | 6/1994 | Broderick et al. | 342/1 |
| 5,389,434 | 2/1995 | Chamberlain et al. | 428/323 |
| 5,438,333 | 8/1995 | Perkins et al. | 342/4 |
| 5,540,996 | 7/1996 | Tanzilli et al. | 428/408 |
| 5,587,231 | 12/1996 | Mereer et al. | 428/283 |
| 5,661,484 | 8/1997 | Shumaker et al. | 342/1 |
| 5,844,518 | 12/1998 | Berg et al. | 342/4 |

FOREIGN PATENT DOCUMENTS

| | | |
|---|---|---|
| 0374795 | 6/1990 | European Pat. Off. . |
| 0394207 | 10/1990 | European Pat. Off. . |
| 2610780 | 8/1988 | France . |
| 2743940 | 7/1997 | France . |
| 59-026208 | 10/1984 | Japan . |
| 09092996 | 4/1997 | Japan . |

*Primary Examiner*—Peter A. Nelson
*Attorney, Agent, or Firm*—Samuels, Gauthier & Stevens, LLP

[57] ABSTRACT

An absorber includes a plurality of shredded foam particles and a plurality of fiber whiskers. The fiber whiskers are interspersed among, and attach to the shredded foam particles to create a foam-fiber mixture. A curable adhesive is added to the foam-fiber mixture and the cured mixture is molded to form the radar absorber. The fiber whiskers are less than about two weight percent of the absorbers. The foam particles are preferably formed by shredding scrap foam. The particles are generally irregularly shaped and the size of the particles can be expressed as having a mean size of about ⅛" to 1" diameter, although the particles are not necessarily spherical. The fibers are about ⅛" to ¾" in length and have a diameter of about 7.3 microns. To form the absorber, shredded foam particles are mixed with fiber whiskers, and the fiber whiskers attach themselves to the surface of the shredded foam particles. The mixing is preferably driven by turbulent air which causes the fiber whiskers to attach to the shredded foam. The velocity of the air is then reduced and the tumbling foam-fiber mixture is sprayed with curable polyurethane binder. The resultant mass then placed into a mold and cured to form the absorber. Advantageously, the absorber of the present invention is significantly less expensive than prior art absorbers. This is primarily due to the use of shredded scrap foam and the reduced need for fire retardant materials. In addition, the cured foam-fiber mixture is easily molded to create the desired absorber shape. Molding allows various absorber shapes to be formed.

11 Claims, 3 Drawing Sheets

RADAR ABSORBER AND METHOD OF MANUFACTURE

CROSS REFERENCE TO RELATED APPLICATIONS

This application claims priority from the provisional application designated Ser. No. 60/053,502, filed Jul. 23, 1997 and entitled "Improved Radar Absorber".

BACKGROUND OF THE INVENTION

The invention relates to the field of absorbers of electromagnetic energy, and in particular to a passive foam-fiber radar absorber.

To test radar systems and other RF transmitters or receivers, passive absorbers have long been used to cover reflective walls inside a test chamber (e.g., an anechoic chamber). Generally, the principle objective of these absorbers is to coat reflective surfaces so any incident RF energy that strikes the absorber is largely absorbed and attenuated, rather than being reflected. The absorbers create an environment having no reflective boundaries so radar systems and antennas can be tested as if you are testing in an open field. Absorbers are also used on naval vessels and military aircraft to reduce radar cross section (RCS).

In order to capture the RF energy, the best performing absorbers are generally pyramid shaped. This shape provides a gradual impedance transition which facilitates absorbing RF energy. Resistive material within the absorber converts the RF energy to heat which is dissipated. Absorbers are available for a wide range of frequencies (e.g., 10 MHz–100 GHz).

To form a pyramid shaped absorber one basically starts with a low density polyurethane foam, such as furniture grade foam. The foam is then immersed in an aqueous dispersion that includes carbon black and a binder material. Specifically, the foam is placed between a pair of parallel plates that are squeezed tight, and then submerged in a tank containing the aqueous dispersion. The plates are opened and closed several times so the carbon dispersion can be squeezed into the foam, analogous to a sponge. The foam is then raised above the surface, squeezed to remove excess solution and dried in a oven. Once dry, the foam is trimmed to the final shape.

There are a number of problems with this process. First, the carbon black film deposited onto the surface of the foam cells is a difficult material to control with respect to electrical resistance. For example, the resistance of carbon black varies lot-to-lot. In addition, because of the difference in pressure applied by the plates to the foam, there may be a higher concentration of carbon in the center of the foam versus the outside, or vice versa. Furthermore, there is generally a gravity gradient caused by migration of the dispersion of carbon black as the foam dries, and as a result more carbon is located at the base of the piece. Therefore, it is very difficult to realize an absorber having uniform resistance.

Another problem with prior art absorbers is cost. Top quality furniture grade foam is required, and this foam is expensive. In addition, the energy cost to dry the wet piece of foam is relatively high.

Yet another problem with prior art absorbers is that they are full of carbon black that is capable of burning and smoldering. As a result, a significant amount of fire retardant material has to be added. Typically 75% of the absorber weight and raw material cost relates to the fire retardant material.

Furthermore, the absorber shape has been limited to geometries which are attainable using an abrasive saw or a hot wire cutter. This significantly limits how the material can be shaped.

Therefore, there is a need for a reduced cost, uniform electromagnetic absorber.

SUMMARY OF THE INVENTION

An object of the present invention is to provide an easily manufactured, low cost absorber.

A further object is to provide an absorber having relatively uniform attenuation throughout the absorber.

Briefly, according to the present invention, an absorber includes a plurality of shredded foam particles and a plurality of electrically resistive fiber whiskers. The fiber whiskers are interspersed among, and pierce into the shredded foam particulates to created a foam-fiber mixture. A curable adhesive is added to the foam-fiber mixture and the cured mixture is molded to form the radar absorber. The fiber whiskers are less than about two percent by weight of the absorber.

The foam particles are preferably formed by shredding scrap foam. The particles are generally irregular shaped and the size of the particles can be expressed as having a mean size of about ⅛" to 1" diameter, although the particles are not spherical. The fibers are about ⅛" to ¾" in length and have a diameter of about 5–50 microns (preferably about 7.3 microns). The absorber preferably includes about 0.01 to 1 percent by weight of fiber whiskers.

To form the absorber, shredded foam particles are mixed with fiber whiskers, and the fiber whiskers attach/entangle themselves to the irregularly shaped shredded foam particles. The mixing is preferably driven by turbulent air which causes the fiber whiskers to attach mechanically to the shredded foam. The velocity of the air is then reduced and the tumbling foam-fiber mixture is sprayed with curable polyurethane binder. The resultant mass is then placed into a mold and cured to form the absorber. The dispersion of the carbon fibers can also be accomplished using a slow tumbling action, but the high turbulence decreases the time required to disperse the fibers.

Advantageously, the absorber of the present invention is significantly less expensive than prior art absorbers. This is primarily due to the use of shredded foam and the reduced need for fire retardant additives. In addition, the cured foam-fiber mixture is easily molded to create the desired absorber shape. Molding allows various absorber shapes to be formed.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
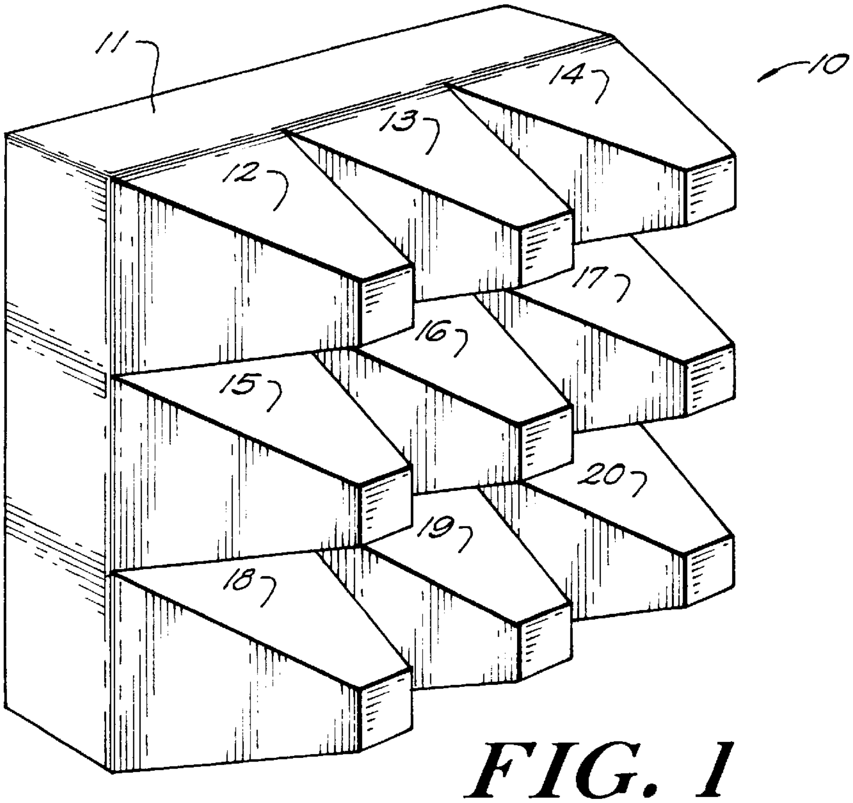
FIG. 1 illustrates a perspective view of a truncated pyramid absorber.

FIG. 1 illustrates a perspective view of a truncated pyramid absorber 10. The absorber 10 is a single piece construction having a base 11 and a plurality of truncated pyramids 12–20. Both the base 11 and the plurality of pyramids 12–20 are formed of material that absorbs incident electromagnetic energy across a wide frequency band. For example, the material can be designed to absorb electromagnetic energy across all or part of the frequencies from 10 MHz to 100 GHz.

The present invention shall be discussed in the context of an absorber having a truncated pyramid shape. However, one of ordinary skill will recognized that absorbers may be formed into various shapes, hollow and/or solid, depending upon the application and the surface to be covered by the absorber.

Figure 2:
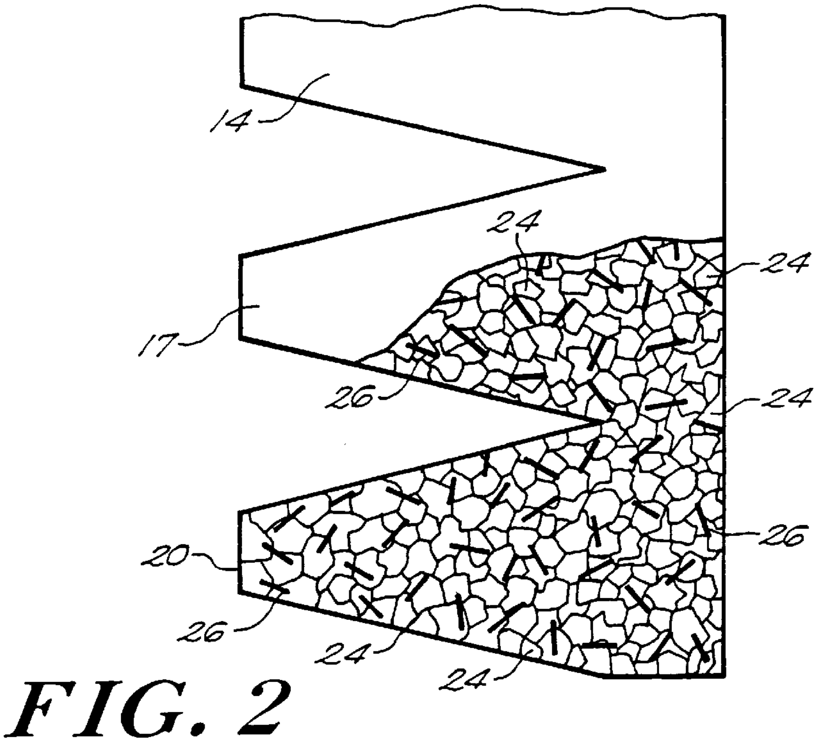
FIG. 2 illustrates a cross-sectional view of the truncated pyramid absorber.

FIG. 2 illustrates a cross-sectional view of several of the truncated pyramids 14, 17 and 20. According to the present invention, the absorber 10 includes a plurality of shredded foam particles 24 and interspersed electrically resistive fiber whiskers 26 (e.g., carbon, graphite, etc). The absorber 10 also includes a curable adhesive (not shown) which bonds the shredded foam particles 24 and the fibers 26. The absorber may also include fire retardant material. We shall now discuss a method of manufacturing the absorber.

The absorber 10 preferably uses shredded foam particles that are created by shredding scrap foam which is available at low cost. Incidentally, shredded scrap foam is often molded into sheets and is used for carpet underlayments. This scrap foam is placed into a shredding machine that generally includes a series of rotating opposing knives. The distance between the knives and their rotational speed can be controlled to achieve a desired particle size. The particles are generally irregular shaped and their size can be expressed as having a mean size of about ⅛" to 1" diameter, although the particulates are not spherical. In general, using a mixture of different foam particle sizes assists in packing.

Figure 3:
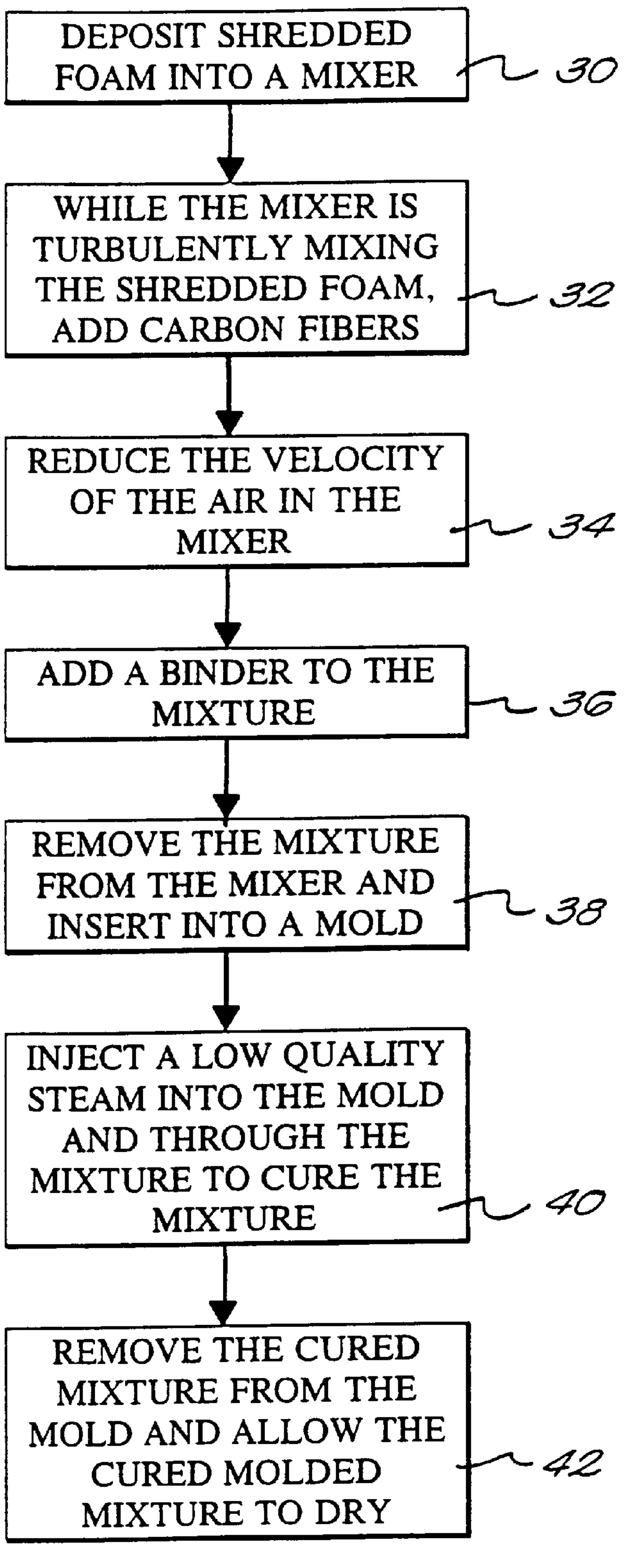
FIG. 3 is a flow-chart illustration of a method for manufacturing an absorber of the present invention.

FIG. 3 is a flow chart illustration of a method for manufacturing the absorber of the present invention. In step 30 the shredded foam particles are deposited into a turbulent air mixer. The mixer may be a drum with two inlets of air blowing into it and an exhaust which is filtered with a fine screen. The air inlets are preferably located at the top and bottom of the drum. Once the shredded foam particles are deposited into the mixer, blowers are enabled to introduce a turbulent air flow that rapidly whips the foam particles within the mixer. In step 32 a measured amount of carbon fibers are added to the mixer and the fibers quickly disperse and latch onto the surface (e.g., pierce the surface) of the shredded foam particles. This amount of fibers is less than about two percent by weight, and preferably in the range of about 0.01 to 1 percent by weight. A preferred carbon fiber is the Fortafil type 3(c) fiber available from Akzo Nobel.

In one embodiment, the mixer is roughly a fifty-five gallon drum, and it takes approximately two minutes to get all the fibers deposited into the drum and mixed. In general, the airflow within the mixer should be a turbulent, non-laminar, irregular flow which facilitates impinging/mechanically attaching the fiber whiskers on the foam particles.

Once the foam particles and the fibers are mixed, the velocity of the air introduced into the mixer is reduced (step 34) to an amount that is just enough to turn over the mixture of foam particles and fibers. This can be achieved by shutting-off airflow through the top inlet and just allowing the airflow from the bottom inlet to percolate the mixture.

Step 36 is then performed to apply a spray of steam curing polyurethane adhesive. This adhesive helps to hold the fibers in place and it takes about 2–3 minutes to spray the adhesive into the mixer. Once all the adhesive has been added, the mixture continues to be mixed for another thirty seconds or so. The adhesive may include Prepolymer-10 which is available from Carpenter Co. of Richmond Va. This is a water curing isocyante prepolymer. The adhesive is prepared by diluting 50 grams of Prepolymer-10 with 50 grams methylene chloride. This quantity is added to 1000 grams of the shredded foam/carbon fiber mixture by spraying. The range of concentration of Prepolymer-10 may range from one-half to twice this amount. In general, the amount of adhesive added should be enough to simply to ensure integrity of the finished piece, thus keeping the dielectric constant of the piece as low as practical.

Step 38 is then performed to remove the mixture from the mixer and place it into a mold. The mold may be a two-component mold having a male and the female section representative of whatever profile one wants the absorber to be. The mixture is packed into the female mold section in greater density than its natural bulk density. This may be accomplished by partially filling the female mold and then inserting the male section to lightly pack the mixture. Additional mixture is added to the female mold and packed again. This may be repeated a number of times to pack the female mold. In general, the mold is filled and packed to provide relatively uniform density.

One empirically derived technique for providing relative uniform density is to first fill the female mold about ¾ of the way. The male mold piece is then inserted to depress the mixture. The male mold section is removed and the female section mold is filled again to approximately ¾ of the way and the male section again is pressed in. This process is repeated several more times and finally the mold is filled and closed.

Next step 40 is performed to inject steam into the mold and through the mixture to cure the mixture (i.e., bond the various foam particles together). This is accomplished by injecting steam through the mixture. The mold includes a series of small holes that let the steam escape. The steam is uniformly dispersed throughout the mixture within the mold for approximately three minutes. The steam is then turned-off and the mold is allowed to cool. Step 42 is then performed to remove the cured mixture from the mold and air dry the mixture. The cured mixture may also be dried in a low temperature oven. Finishing operations such as trimming the flash, painting, and electrical testing are then performed.

An advantage of the present invention is that it may be used with a number of different molds. For example, molds can be used to form a solid pyramidal shape or hollow pyramids.

A further advantage of the invention is that the distribution and characteristics of the fibers can be controlled to improve the electrical performance of the absorber. Several parameters can be controlled to optimize the absorber design. For example, molding allows a number of different shapes and tapers to be used. In addition, the selection of the type of electrically resistive fiber (e.g., carbon or graphite), and its length, can be used to control the characteristics (e.g., the dielectric) of the absorber.

Figure 4:
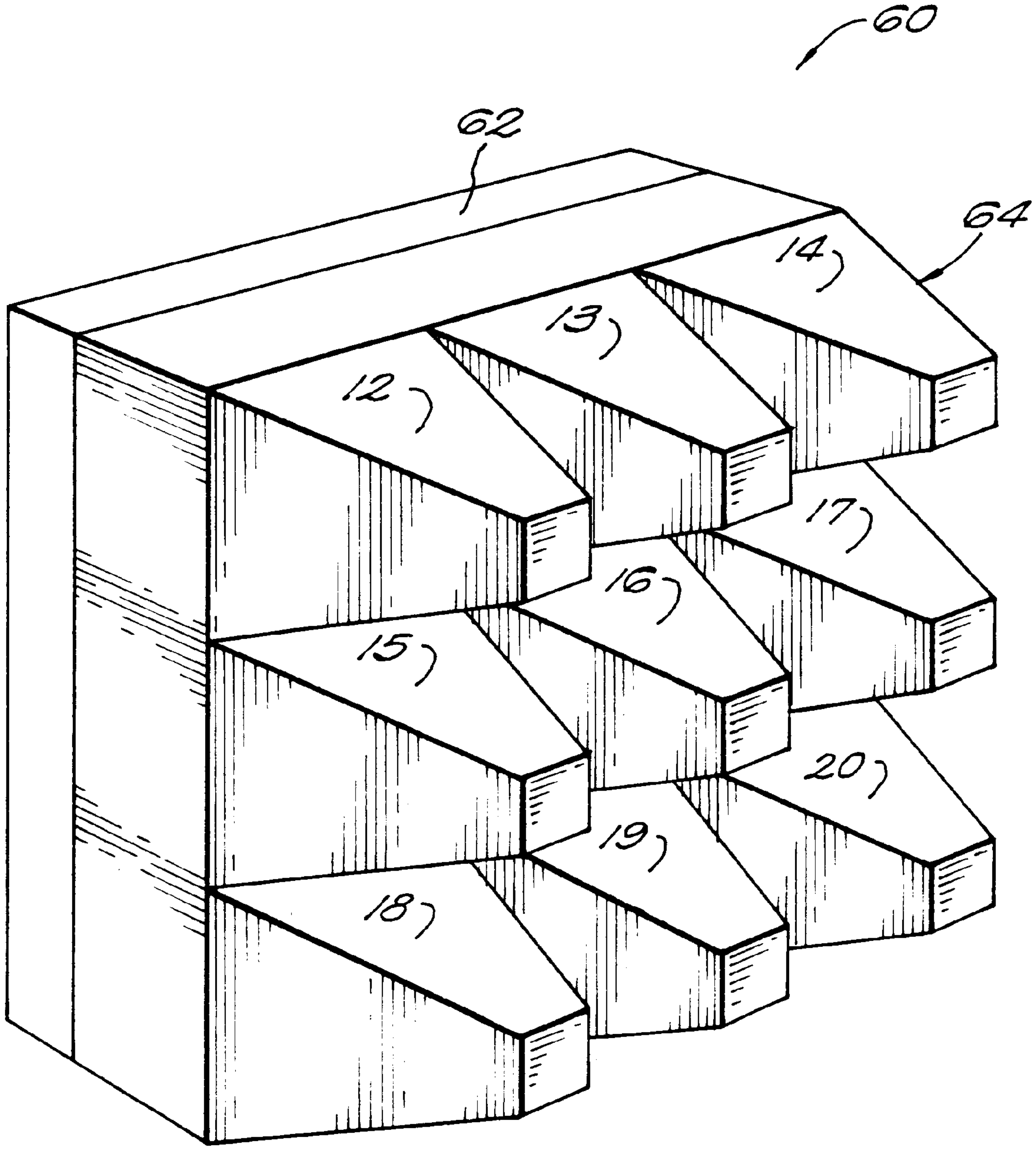
FIG. 4 is a perspective view of a broadband truncated pyramid absorber.

The shredded foam absorber of the present invention may also be combined with other absorbers to provide a broadband absorber. FIG. 4 is a perspective view of a broadband truncated pyramid absorber 60. The absorber includes a planar ceramic ferrite tile absorber 62 that is covered by a shredded foam absorber 64. The tile absorber has dielectric properties which permit it to attenuate relatively low frequencies (e.g., 10–500 MHz). The shredded foam absorber may be designed to be effectively transparent to low frequency electromagnetic energy, and the low frequency energy is absorbed by the ceramic ferrite tile absorber 62. A low loss, low dielectric spacer layer (not shown) may be required as a matching layer between the absorbers 62, 64.

Although the present invention has been discussed in the context of carbon as a preferred fiber, it is contemplated that other electrically resistive fibers may also be used. Generally, these resistive fibers have a relatively high aspect ratio.

Although the present invention has been shown and described with respect to several preferred embodiments thereof, various changes, omissions and additions to the form and detail thereof, may be made therein, without departing from the spirit and scope of the invention.

What is claimed is:

1. An absorber for absorbing incident electromagnetic energy, comprising a plurality of shredded foam particles and electrically resistive fiber whiskers interspersed between said plurality of shredded foam particles and a cured binder, wherein said fiber whiskers are less than about two weight percent of the absorber weight.

2. The absorber of claim 1, wherein said foam particles have a size of about ⅛" to 1" mean diameter and said fiber whiskers comprise carbon fibers and the amount of said carbon fibers is about 0.01 to 1 weight percent.

3. The absorber of claim 1, wherein said carbon fibers are about ⅛" to ¾" in length.

4. The absorber of claim 1, wherein the absorber is shaped substantially as a truncated pyramid.

5. The absorber of claim 1, wherein said fiber whiskers comprise graphite fibers.

6. The absorber of claim 1, wherein said fiber whiskers comprise carbon fibers.

7. A method of forming a radar absorber, comprising the steps of:

mixing together shredded foam particles and electrically resistive fiber whiskers such that said electrically resistive fibers attach to said shredded foam particles to produce a foam-fiber mixture;

mixing a binder into said foam-fiber mixture;

curing said bonded mixture to provide a cured mixture; and molding said cured mixture to form the radar absorber.

8. The method of claim 7, wherein said step of mixing comprises the step of adding about 0.01% to 1% weight of carbon fiber relative to the total absorber weight.

9. The method of claim 7, wherein during said step of mixing said foam particles and said electrically resistive fibers, said electrically resistive fibers are dispersed and mechanically attach to the surface of said foam particles.

10. The method of claim 7, wherein said step of curing includes passing steam through said bonded mixture.

11. The method of claim 9, wherein said step of mixing together a plurality of shredded foam particles and a plurality of electrically resistive fiber whiskers includes the step of mixing said plurality of shredded foam particles and a plurality of carbon fiber whiskers in a turbulent air flow.

* * * * *